(12) United States Patent
Alasaad et al.

(10) Patent No.: US 9,973,441 B2
(45) Date of Patent: May 15, 2018

(54) METHOD AND SYSTEM FOR ESTABLISHING ROUTES IN WIRELESS AD-HOC NETWORKS UTILIZING BAYESIAN APPROACH

(71) Applicant: The King Abdulaziz City for Science and Technology, Riyadh (SA)

(72) Inventors: Amr Alasaad, Riyadh (SA); Wafaa Alkhabbaz, Riyadh (SA); Meshal Alshayea, Riyadh (SA); Ammar Hazzazy, Riyadh (BY)

(73) Assignee: King Abdulaziz City of Science and Technology (KACST), Riyadh (SA)

( * ) Notice: Subject to any disclaimer, the term of this patent is extended or adjusted under 35 U.S.C. 154(b) by 233 days.

(21) Appl. No.: 14/935,379

(22) Filed: Nov. 7, 2015

(65) Prior Publication Data
US 2017/0134306 A1    May 11, 2017

(51) Int. Cl.
| | |
|---|---|
| H04W 4/00 | (2018.01) |
| H04L 12/927 | (2013.01) |
| H04L 12/755 | (2013.01) |
| H04L 12/741 | (2013.01) |
| H04L 12/733 | (2013.01) |
| H04W 40/00 | (2009.01) |
| H04W 84/18 | (2009.01) |

(52) U.S. Cl.
CPC .......... *H04L 47/806* (2013.01); *H04L 45/021* (2013.01); *H04L 45/20* (2013.01); *H04L 45/74* (2013.01); *H04W 40/00* (2013.01); *H04W 84/18* (2013.01)

(58) Field of Classification Search
CPC .............................. H04W 84/18; H04W 48/16
See application file for complete search history.

(56) References Cited

U.S. PATENT DOCUMENTS

| | | | | |
|---|---|---|---|---|
| 2004/0233855 | A1* | 11/2004 | Gutierrez | H04L 45/00 370/252 |
| 2005/0111428 | A1* | 5/2005 | Orlik | H04L 45/02 370/344 |
| 2007/0260911 | A1* | 11/2007 | Marilly | H04L 41/0663 714/4.1 |
| 2008/0240112 | A1* | 10/2008 | Muqattash | H04W 40/28 370/395.31 |
| 2014/0177518 | A1* | 6/2014 | Akisada | H04W 40/00 370/315 |

* cited by examiner

*Primary Examiner* — Kevin C Harper
(74) *Attorney, Agent, or Firm* — Timberline Patent Law Group PLLC

(57) ABSTRACT

The invention provides a method and system for routing broadcast messages by managing a plurality of observation tables in a wireless ad-hoc network having a plurality of nodes. The method includes receiving one or more broadcast messages from one or more second nodes at a first node and stores information received from the broadcast messages pertaining to the one or more second nodes in one or more observation tables at the first node. A maximum aposteriori probability of connectivity is then computed for the one or more second nodes based on the information in the one or more observation tables maintained at the first node utilizing Bayesian approach. Thereafter, the first node transmits broadcast messages to the one or more second nodes based on the maximum aposteriori probability of connectivity computed for the one or more second nodes from the first node.

20 Claims, 12 Drawing Sheets

| Connectivity 402 | Hop Count 404 | Message Identifier 406 | Weight 408 |
|---|---|---|---|
| | | | |

| Connectivity | Hop Count | Message Identifier | Weight |
|---|---|---|---|
| 0 | 0 | | |

FIG. 6a

| Connectivity | Hop Count | Message Identifier | Weight |
|---|---|---|---|
| 1 | 1 | | |

FIG. 6b

| Connectivity | Hop Count | Message Identifier | Weight |
|---|---|---|---|
| 1 | 1 | | |

FIG. 6c

| Connectivity | Hop Count | Message Identifier | Weight |
|---|---|---|---|
| 1 | 2 | | |

FIG. 6d

| Connectivity | Hop Count | Message Identifier | Weight |
|---|---|---|---|
| 1 | 1 | | |

FIG. 6e

| Connectivity | Hop Count | Message Identifier | Weight |
|---|---|---|---|
| 1 | 2 | | |

FIG. 6f

| Connectivity | Hop Count | Message Identifier | Weight |
|---|---|---|---|
| 1 | 1 | | |

FIG. 6g

| Connectivity | Hop Count | Message Identifier | Weight |
|---|---|---|---|
| 1 | 2 | | |
| 1 | 3 | | |

FIG. 6h

| Connectivity | Hop Count | Message Identifier | Weight |
|---|---|---|---|
| 1 | 1 | | |

FIG. 6i

| Connectivity | Hop Count | Message Identifier | Weight |
|---|---|---|---|
| 1 | 1 | | |

FIG. 6j

| Connectivity | Hop Count | Message Identifier | Weight |
|---|---|---|---|
| 0 | 0 | | |

FIG. 6k

| Connectivity | Hop Count | Message Identifier | Weight |
|---|---|---|---|
| 0 | 0 | | |

FIG. 6l

| Connectivity | Hop Count | Message Identifier | Weight |
|---|---|---|---|
| 1 | 1 | | |
| 1 | 1 | | |

FIG. 6m

| Connectivity | Hop Count | Message Identifier | Weight |
|---|---|---|---|
| 0 | 0 | | |
| 1 | 2 | | |

FIG. 6n

| Number of hops to destination | 1 hop | 2 hops | 3 hops | …… | n hops |
|---|---|---|---|---|---|
| Back off time ($t_k^*$) | 0 to $(1/n)X$ | $(1/n)X$ to $(2/n)X$ | $(2/n)X$ to $(3/n)X$ | …… | $((n-1)/n)X$ to $X$ |

FIG. 8

| CONNECTIVITY | HOP COUNT | MESSAGE IDENTIFIER | WEIGHT |
| --- | --- | --- | --- |
| 0 | 0 | | 1/6 |
| 1 | 2 | | 2/6 |
| 1 | 2 | | 3/6 |
| 1 | 3 | | 4/6 |
| 0 | 0 | | 5/6 |
| 1 | 2 | | 6/6 |

FIG. 9

METHOD AND SYSTEM FOR ESTABLISHING ROUTES IN WIRELESS AD-HOC NETWORKS UTILIZING BAYESIAN APPROACH

FIELD OF THE INVENTION

The invention generally relates to the field of establishing routes in wireless ad-hoc networks for routing broadcast messages. More specifically, the invention relates to a method and system for managing a plurality of observation tables in a wireless ad-hoc network having a plurality of nodes and utilizing the plurality of observation tables for establishing routes in the wireless ad-hoc network utilizing Bayesian approach.

BACKGROUND OF THE INVENTION

Wireless ad-hoc networks are defined as multi-hop wireless networks having a plurality of nodes with no predefined infrastructure. Therefore, the plurality of nodes in the wireless ad-hoc networks communicates among themselves by creating a network "on-the-fly". Generally, the process of routing information in the wireless ad-hoc networks is a core problem due to certain limitations of the wireless ad-hoc networks such as, but not limited to, limited bandwidth, high dynamic topology, link interference, limited range of links, and limited broadcast capabilities.

In the prior art, there are several routing protocols proposed for the wireless ad-hoc networks. In general, these routing protocols are classified into two categories as proactive and reactive protocols. Proactive protocols such as Destination-Sequenced Distance Vector (DSDV) establish routes by maintaining routes to all nodes at all times using routing tables, while reactive protocols such as Ad-hoc On Demand (AODV) and Dynamic Source Routing (DSR) establish a route dynamically only when it is required. Both the proactive and reactive protocols require a large number of control messages to be exchanged among the nodes in order to establish routes which causes excessive flooding in the wireless ad-hoc networks and consumes large bandwidth.

Therefore, in light of the above, there is a need for an improved method and system for establishing routes in wireless ad-hoc networks only upon demand while reducing the number of control messages exchanged between the nodes for establishing the routes.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 6a depicts status of observation table maintained by node 102c for node 102b in accordance with an embodiment of the invention.

FIG. 6b depicts status of observation table maintained by node 102e for node 102b in accordance with an embodiment of the invention.

FIG. 6c depicts status of observation table maintained by node 102a for node 102b in accordance with an embodiment of the invention.

FIG. 6d depicts status of observation table maintained by node 102d for node 102b in accordance with an embodiment of the invention.

FIG. 6e depicts status of observation table maintained by node 102d for node 102c in accordance with an embodiment of the invention.

FIG. 6f depicts status of observation table maintained by node 102f for node 102b in accordance with an embodiment of the invention.

FIG. 6g depicts status of observation table maintained by node 102f for node 102e in accordance with an embodiment of the invention.

FIG. 6h depicts status of observation table maintained by node 102f for node 102b in accordance with an embodiment of the invention.

FIG. 6i depicts status of observation table maintained by node 102e for node 102f in accordance with an embodiment of the invention.

FIG. 6j depicts status of observation table maintained by node 102d for node 102f in accordance with an embodiment of the invention.

FIG. 6k depicts status of observation table maintained by node 102c for node 102f in accordance with an embodiment of the invention.

FIG. 6l depicts status of observation table maintained by node 102a for node 102f in accordance with an embodiment of the invention.

FIG. 6m depicts status of observation table maintained by node 102d for node 102f in accordance with an embodiment of the invention.

FIG. 6n depicts status of observation table maintained by node 102c for node 102f in accordance with an embodiment of the invention.

FIG. 8 illustrates a mapping table that provides a mapping between number of hops on a path and back-off time parameter in accordance with an embodiment of the invention.

FIG. 9 illustrates an observation table maintained at a node i for node j with weights pertaining to each record of node j maintained in the observation table.

Figure 1:
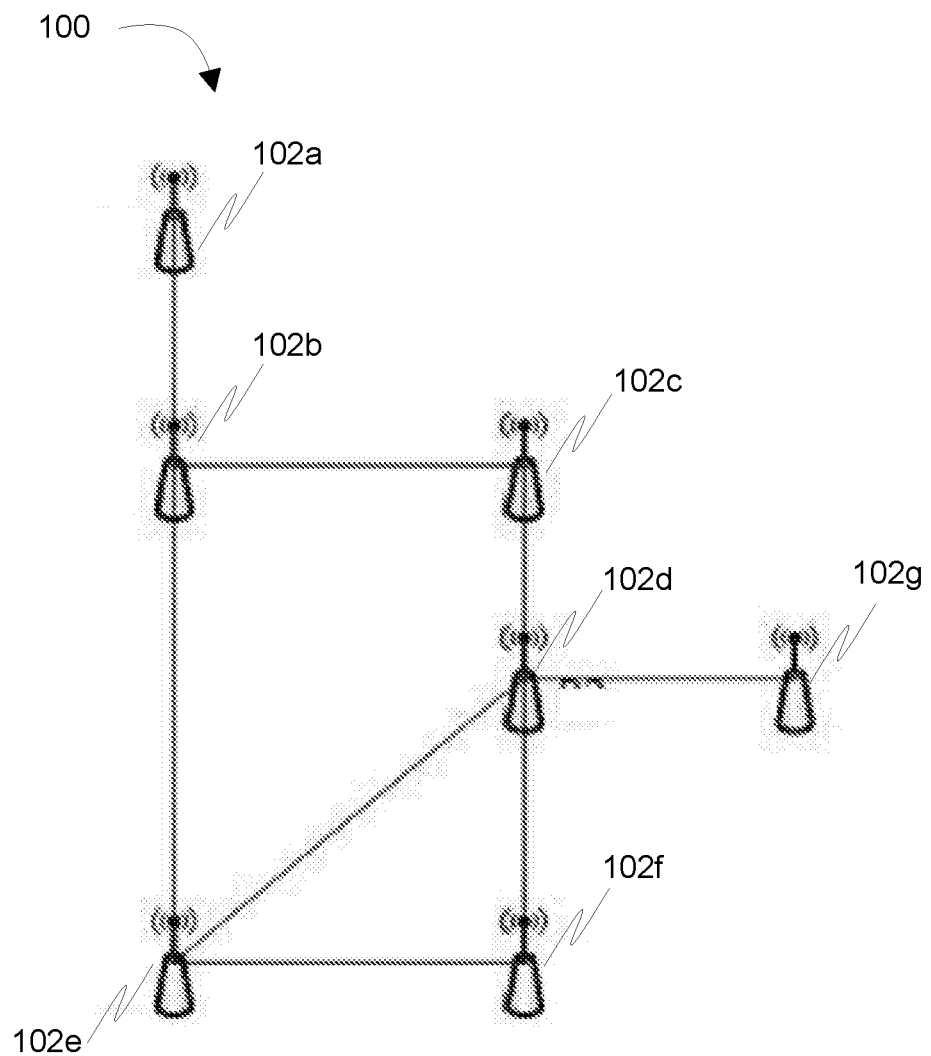
FIG. 1 illustrates a wireless ad-hoc network in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to managing a plurality of observation tables in a wireless ad-hoc network having a plurality of nodes and utilizing the plurality of observation tables for establishing routes in the wireless ad-hoc network utilizing Bayesian approach.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for routing broadcast messages by managing a plurality of observation tables in a wireless ad-hoc network having a plurality of nodes. The method includes receiving one or more broadcast messages from one or more second nodes at a first node and storing information pertaining to the one or more second nodes in one or more observation tables at the first node. The information is obtained from the one or more broadcast messages received from the one or more second nodes. A maximum aposteriori probability of connectivity is then computed for the one or more second nodes based on the information in the one or more observation tables maintained at the first node utilizing Bayesian approach. Thereafter, the first node transmits broadcast messages to the one or more second nodes based on the maximum aposteriori probability of connectivity computed for the one or more second nodes from the first node.

FIG. 1 illustrates a wireless ad-hoc network 100 in accordance with an embodiment of the invention. As illustrated, wireless ad-hoc network 100 includes a plurality of nodes 102a-102g. Plurality of nodes 102a-102g can include one or more source nodes, one or more destination nodes and one or more relay nodes. Plurality of nodes 102a-102g communicate with each other via wireless ad-hoc network 100 for establishing routes for transmitting information in wireless ad-hoc network 100. Plurality of nodes 102a-102g communicate with each other by exchanging one or more broadcast messages that are either received or overheard by other nodes in Plurality of nodes 102a-102g. The one or more broadcast messages can be, but not limited to, a route request (RREQ) message, a re-broadcast message and a route reply (RREP) message. A route request message is a broadcast message that is initiated by a source node that needs to establish a route to a destination node. A route reply message is a broadcast message initiated by a destination node in response to a route request message received from the source node. A re-broadcast message is either a route request message or a route reply message that is relayed for transmission via one or more relay nodes to either a source node or a destination node. Further, a broadcast message includes information such as, but not limited to, an IP address of a source node, an IP address of a destination node and an IP address of one or more relay nodes.

Consider a scenario, wherein a source node wants to establish a route to a destination node. In accordance with the scenario, the source node initiates a RREQ message. The RREQ message includes an IP address of the source node and an IP address of the destination node. The RREQ message is then overheard by each of the one or more relay nodes in wireless ad-hoc network 100. On overhearing the RREQ message, each of the one or more relay nodes rebroadcast the RREQ message after appending IP addresses of each of the one or more relay nodes to the RREQ message. Once the RREQ message reaches the destination node, a path is selected at the destination node. The destination node, then, replies back with a route reply (RREP) message via the selected path by appending IP information pertaining to relay nodes in the selected path.

Figure 2:
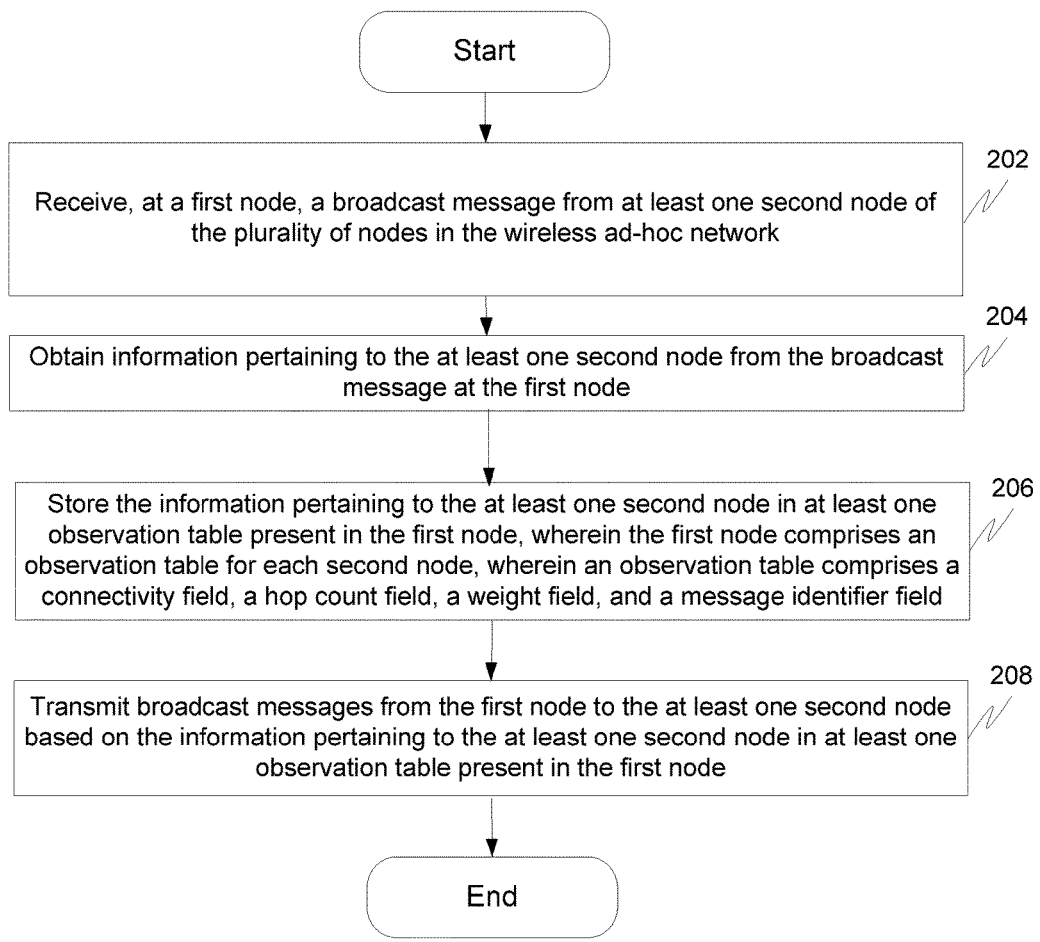
FIG. 2 illustrates a flowchart of a method for routing broadcast messages by managing a plurality of observation tables in a wireless ad-hoc network in accordance with an embodiment of the invention.

FIG. 2 is a flowchart illustrating a method for routing broadcast messages by managing a plurality of observation tables in wireless ad-hoc network 100 in accordance with an embodiment of the invention. Each node of Plurality of nodes 102a-102g maintains an observation table corresponding to every other node of plurality of nodes 102a-102g in wireless ad-hoc network 100.

At step 202, a broadcast message is received at a first node from one or more second nodes of plurality of nodes 102a-102g. The first node and the one or more second nodes can be at least one of a source node, a relay node and a destination node. The broadcast message received at the first node can be at least one of a route request message from a source node for a destination node, a re-broadcast message from a relay node and a route reply message from a destination node. Accordingly, on receiving the broadcast message at the first node, the first node obtains information pertaining to the one or more second nodes from the broadcast message at step 204. Finally, at step 206, the first node stores information pertaining to the one or more second nodes in one or more observation tables present in the first node. Step 206 is further described in detail in conjunction with FIG. 3. Each of the one or more observation tables includes a connectivity field, a hop count field, a message identifier field and a weight field. The observation table is further described in detail in conjunction with description of FIG. 4.

Thereafter, at step 208, the first node transmits broadcast messages to the one or more second nodes based on the information stored in the one or more observation tables corresponding to the one or more second nodes.

Figure 3:
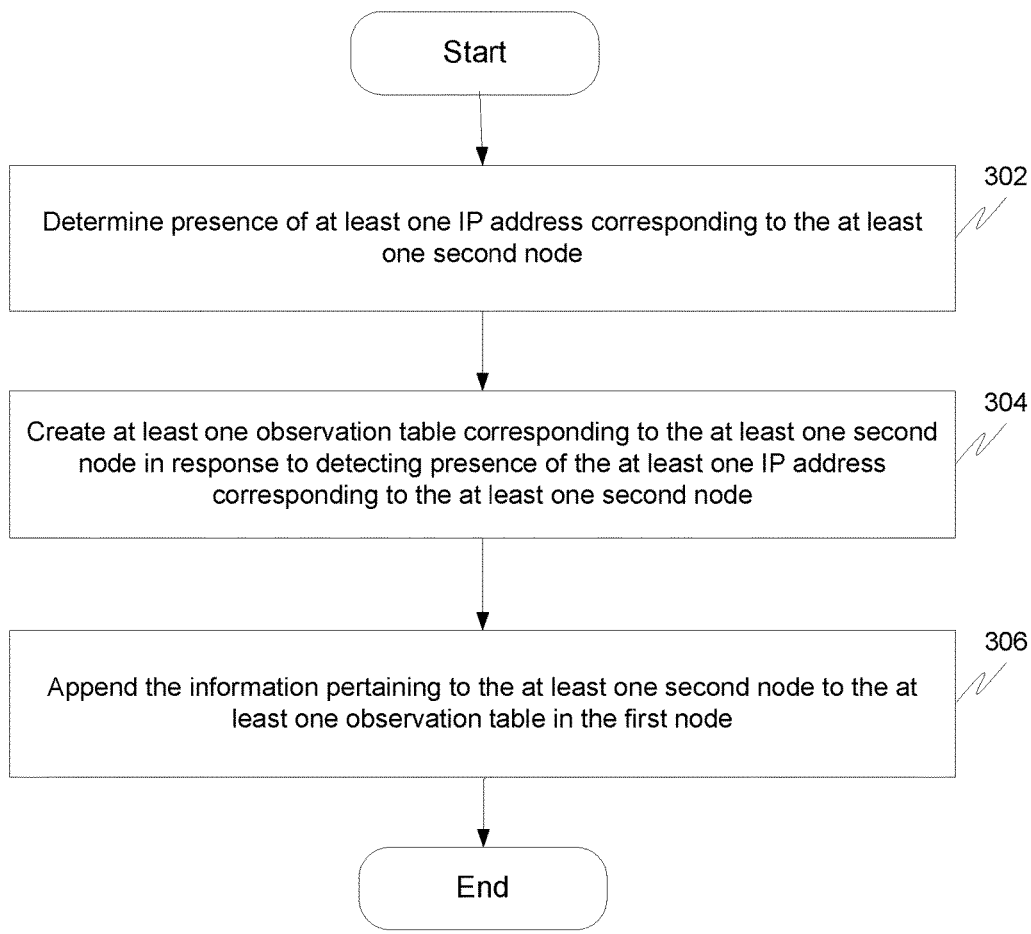
FIG. 3 illustrates a flowchart of a method for storing information pertaining to one or more second nodes obtained from a broadcast message at a first node in one or more observation tables present in the first node in accordance with an embodiment of the invention.

FIG. 3 illustrates a flowchart of a method for storing information pertaining to the one or more second nodes obtained from the broadcast message at the first node in the one or more observation tables present in the first node in accordance with an embodiment of the invention.

At step 302, a presence of one or more IP addresses in the broadcast message corresponding to the one or more second nodes is determined. In response to detecting the presence of the one or more IP addresses, at step 304, one or more observation tables corresponding to each of the one or more second nodes is created at the first node. Finally, at step 306, the information pertaining to the one or more second nodes is appended to the one or more observation tables created at the first node. The information pertaining to the one or more second nodes is appended in the observation table by adding one or more new entries to the one or more observation tables.

Figure 4:
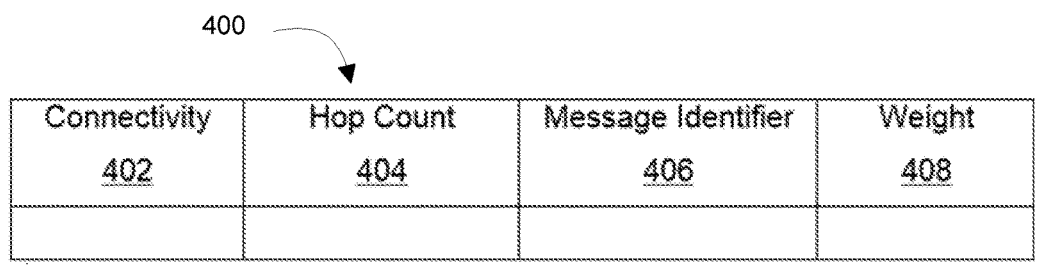
FIG. 4 depicts various fields in an observation table in accordance with an embodiment of the invention.

FIG. 4 depicts various fields in an observation table 400 in accordance with an embodiment of the invention.

As depicted, observation table 400 includes a connectivity field 402, a hop count field 404, a message identifier field 406, and a weight field 408. Connectivity field 402 in an observation table maintained at the first node corresponding to a second node represents a possibility of reaching the second node within 'n' number of hops from the first node, wherein 'n' is a predetermined value and value of 'n' is obtained from information appended in the broadcast message. Connectivity field 402 can take a value of either '1' or '0'. For example, connectivity field 402 is updated with value as '1' in response to detecting an IP address in the broadcast message corresponding to the second node within 'n' number of hops from the first node. On the other hand, connectivity field 402 is updated as '0' in absence of a route reply message from the second node within a predefined time duration, wherein the second node is a destination node.

Hop count field 404 in the observation table maintained at the first node corresponding to a second node represents a number of hops for reaching the second node from the first node.

Message identifier field 406 in the observation table maintained at the first node corresponding to a second node indicates a sequence number of the broadcast message received at the first node from the second node.

Weight field 408 in the observation table maintained at the first node corresponding to a second node represents a scaling factor corresponding to the time at which an IP address of the second node is detected at the first node.

Figure 5:
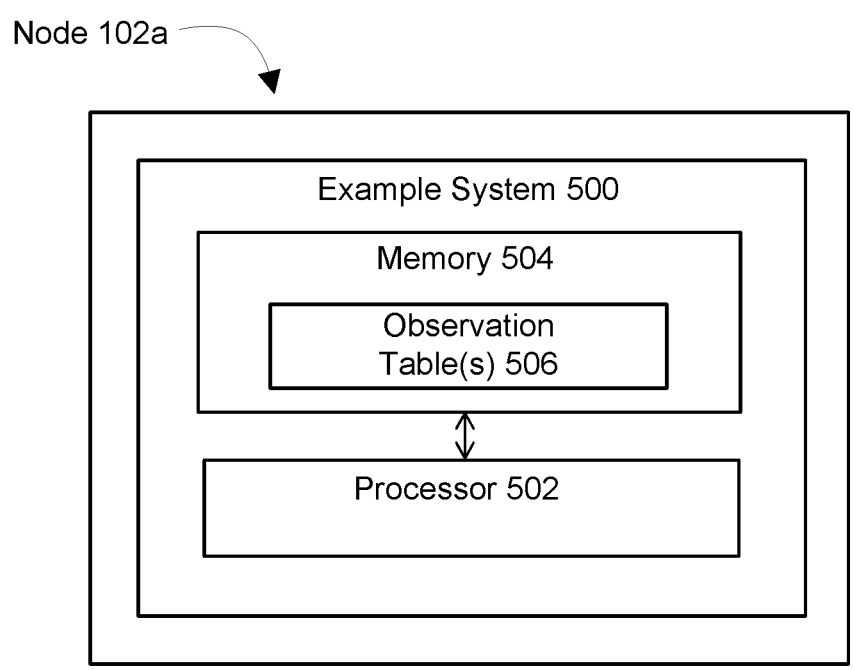
FIG. 5 illustrates a system present within a node for routing broadcast messages by managing one or more observation tables in a wireless ad-hoc network in accordance with an embodiment of the invention.

FIG. 5 illustrates a system 500 present within node 102a for routing broadcast messages by managing one or more of observation tables in wireless ad-hoc network 100 having plurality of nodes 102a-102g in accordance with an embodiment of the invention. Each node of plurality of nodes 102a-102g maintains one or more observation tables corresponding to every other node of plurality of nodes 102a-102g in wireless ad-hoc network 100.

As illustrated, node 102a of plurality of nodes 102a-102g includes a processor 502 and a memory 504. Processor 502 is configured to enable node 102a to receive a broadcast message from one or more second nodes of plurality of nodes 102a-102g in the wireless ad-hoc network. On receiving the broadcast message at node 102a, processor 502 enables node 102a to obtain information pertaining to the one or more second nodes from the broadcast message. Thereafter, processor 502 enables node 102a to store information pertaining to the one or more second nodes in one or more observation tables 506 present in memory 504 of node 102a, wherein node 102a includes an observation table for each second node and wherein an observation table includes a connectivity field, a hop count field, a message identifier field and a weight field as illustrated in FIG. 4.

Processor 502 is further configured to determine presence of one or more IP addresses corresponding to the one or more second nodes. On determining the presence of the one or more IP addresses, processor 502 enables node 102a to create one or more observation tables corresponding to the one or more second nodes and appends the information pertaining to the one or more second nodes in the one or more observation tables. The information pertaining to the one or more second nodes is appended in the observation table by adding one or more new entries to the one or more observation tables.

Thereafter, processor 502 enables the first node to transmit broadcast messages to the one or more second nodes based on the information stored in the one or more observation tables corresponding to the one or more second nodes.

The method and system of the invention described above is further described in detail using an exemplary embodiment as follows.

In accordance with the exemplary embodiment of the invention, node 102b wants to establish a route to node 102f, wherein node 102b is a source node and node 102f is a destination node. In order to establish the route, node 102b broadcasts a RREQ message by appending its IP address and an IP address of node 102f to the packet header of the RREQ message. The RREQ message is then overheard by adjacent nodes node 102c, node 102e and node 102a, wherein node 102c, node 102e and node 102a are relay nodes. On overhearing the RREQ message and detecting the presence of the IP address of node 102b, node 102c, node 102e and node 102a create and populate observation tables for node 102b at each of the nodes node 102c, node 102e and node 102a as illustrated in FIGS. 6a-6c.

Considering that node 102c and node 102e re-broadcast the RREQ message, wherein each of the node 102c and node 102e appends its own IP address to the RREQ message. Considering that the RREQ message re-broadcast by node 102c is now received by node 102d, wherein node 102d is also a relay node, node 102d creates and populates an observation table for node 102b and an observation table for node 102c on detecting the IP addresses in the broadcast message as illustrated in FIGS. 6d and 6e. On the other hand, considering that the RREQ message rebroadcast by node 102e is received at node 102f, node 102f creates and populates an observation table for node 102b and an observation table for node 102e as illustrated in FIGS. 6f and 6g. In the case wherein node 102f were to receive the RREQ message from node 102d, node 102f updates the observation table for node 102b as illustrated in FIG. 6h. Node 102f then replies with a RREP message by selecting a route for transmission, wherein the IP addresses of relay nodes in the selected route are appended in the RREP message. Considering that the relay node in the selected route is node 102e, node 102f appends the IP address of node 102e to the RREP message. When node 102e overhears the RREP message, node 102e populates the observation table node for 102f as illustrated in FIG. 6i. Further, node 102e checks whether its IP address is appended in the RREP message. If the IP address is appended in the RREP message, node 102e rebroadcasts the RREP message.

On the other hand, considering that node 102d also overhears the RREP message sent from node 102f to node 102e, node 102d stops transmitting the RREQ message and checks the packet header of the RREP message to see if its IP address is appended. Since node 102d was not an intended node in the selected route, the IP address of node 102d was not appended in the message RREP message. Hence, node 102d does not re-broadcast the RREP message. However, node 102d populates an observation table for node 102f as illustrated in FIG. 6j. If node 102c, on the other hand, does not receive or overhear the RREP message from node 102f within a certain time limit, node 102c infers that there are no connections or routes from node 102c to node 102f. Hence node 102c populates the observation table for node 102f as illustrated in FIG. 6K. Also, considering that node 102a does not overhear the RREP message from node 102f, the observation table maintained at node 102a for node 102f is updated as illustrated in FIG. 6l.

Continuing with the exemplary embodiment, considering a new node, node 102g is connected to node 102d as illustrated in FIG. 1, wherein node 102g wants to establish a route to node 102f, node 102g sends a REEQ message that reaches node 102f via node 102d. When the RREQ message is received at node 102f, node 102f replies with a RREP message, wherein node 102f appends its preferred path in the RREP message selecting node 102d as a relay node in the preferred path. Node 102d, on overhearing the RREP message, populates the observation table maintained for node 102f as illustrated in FIG. 6m. Further node 102d, relays the RREP message to node 102g. While the RREP message is relayed to node 102g, considering node 102c overhears the RREP message, node 102c populates the observation table maintained at node 102c for node 102f as illustrated in FIG. 6n.

Thus, the nodes, over time, maintain and populate the observation tables for all other nodes in the network based on the RREQ and RREP messages exchanged between the nodes.

The information present in one or more observation tables 506 managed for each node is then utilized for computing a maximum aposteriori probability of connectivity between nodes in the wireless ad-hoc network utilizing Bayesian approach.

Figure 7:
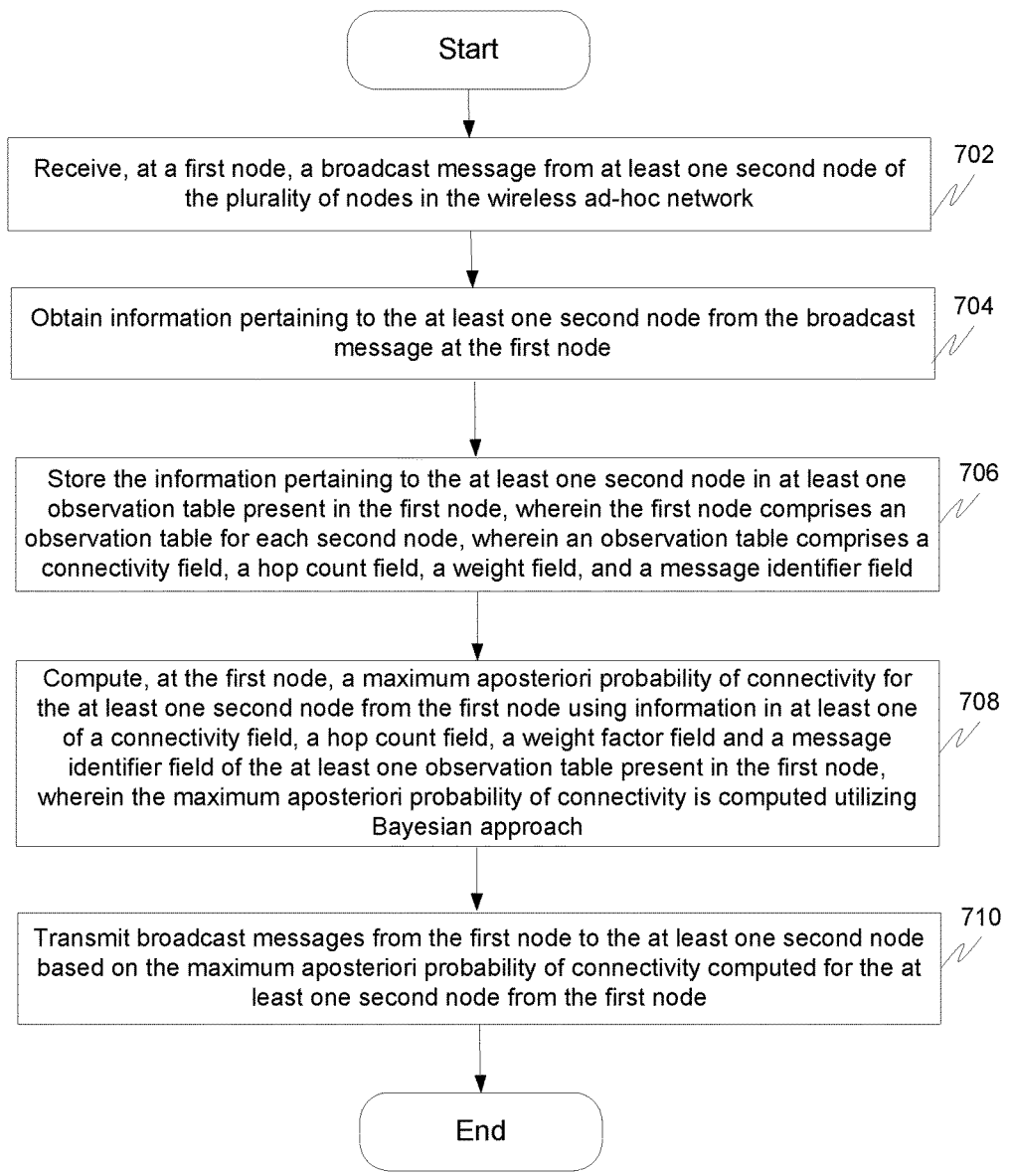
FIG. 7 illustrates a flowchart of a method for routing broadcast messages by computing a maximum aposteriori probability of connectivity for a plurality of nodes in a wireless ad-hoc network in accordance with an embodiment of the invention.

FIG. 7 illustrates a flowchart of a method for routing broadcast messages by computing a maximum aposteriori probability of connectivity for plurality of nodes 102a-102g in wireless ad-hoc network 100 in accordance with an embodiment of the invention. Each node of plurality of nodes 102a-102g maintains an observation table corresponding to every other node of plurality of nodes 102a-102g in wireless ad-hoc network 100.

At step 702, a broadcast message is received at a first node from one or more second nodes of the plurality of nodes. The first node and the one or more second nodes can be at least one of a source node, a relay node and a destination node. The broadcast message received at the first node can be at least one of a route request message from a source node for a destination node, a re-broadcast message from a relay node and a route reply message from a destination node. Accordingly, on receiving the broadcast message at the first node, the first node obtains information pertaining to the one or more second nodes from the broadcast message at step 704. Moving on, at step 706, the first node stores information pertaining to the one or more second nodes in one or more observation tables present in the first node. Each of the one or more observation tables includes a connectivity field, a hop count field, a message identifier field and a weight field. The observation table is further described in detail in conjunction with description of FIG. 8.

Further, at step 708, a maximum aposteriori probability of connectivity for the one or more second nodes from the first node is computed using information in one or more of a connectivity field, a hop count field, a weight field and a message identifier field of the one or more observation tables present in the first node, wherein the maximum aposteriori probability of connectivity is computed utilizing Bayesian approach. Step 708 is further described in detail in conjunction with exemplary embodiments of the invention.

Finally, at step 710, the first node transmits broadcast messages to the one or more second nodes based on the maximum aposteriori probability of connectivity computed for the one or more second nodes from the first node.

In an exemplary embodiment of the invention, a confidence value is computed for reaching a node j from a node i through at least one path containing at least one hop with no more than 'n' hops using information present in one or more of the connectivity field and a scaling factor pertaining to each observation for which the maximum aposteriori probability of connectivity is computed for one or more second nodes, wherein 'n' is a predefined number and can be appended in a broadcast message received at a node.

A probability of connectivity to every other node j is denoted as $P(C_{i\text{-}j})$ and can be computed using the one or more observation tables maintained at each node i for every other node j in wireless ad-hoc network 100. Each node i computes $P(C_{i\text{-}j})_{ML}$ which is a maximum likelihood probability of reaching a node j from a node i through a path that has number of relay nodes no more than 'n', wherein $P(C_{i\text{-}j})_{ML}$ is defined by the equation:

$$P(C_{i,j})_{ML} = \frac{\text{number of 1's in the connectivity field}}{\text{number of '0's and '1's in the connectivity field}}$$

In order to compute the confidence value, each node i computes the maximum aposteriori probability of connectivity using Bayesian approach as follows.

When a node i joins the network, node i assumes a prior probability density distribution about connectivity to a node j '$P(C_{i\text{-}j})$' as the uniform distribution. For every entry for node j in the observation table at node i, node i computes a maximum aposteriori probability of connectivity as $P(P(C_{i\text{-}j})_{MAP}|X_j(1{:}h)) = P(X_j(1{:}h)|P(C_{i\text{-}j})) P(C_{i\text{-}j})/P(X_j(1{:}h))$, wherein '$X_j$' is the records in the connectivity field pertaining to observation tables at node i for node j, 'h' is the number of observation records upon which the probability is computed, and the $P(X_j(1{:}h)|P(C_{i\text{-}j}))$ follows a Bernoulli distribution and computed as
$P(X_j(1{:}h)|P(C_{i\text{-}j}){=}1) = P(C_{i\text{-}j})^m (1-P(C_{i\text{-}j}))^{(h-m)}$, where 'm' is number of '1's. Further, in order to simplify computation of $P(X_j(1{:}h)|P(C_{i\text{-}j}){=}1)$, the Beta distribution 'Beta $(\alpha, \beta)$' is considered for the prior probability $P(C_{i\text{-}j})$, where $\alpha, \beta$ are know as hyper parameters. Hence, $$P(P(C_{i-j})_{MAP} \mid Xj(1:h)) = \frac{\Gamma(\alpha' + \beta')}{\Gamma(\alpha')\Gamma(\beta')} \cdot \theta^{\alpha'-1} \cdot (1-\theta)^{(\beta'-1)} = \text{Beta}(\alpha', \beta'),$$

$\alpha'{=}m{+}\alpha$, $\beta'{=}h{-}m{+}\beta$, $\Gamma$ is a Gamma function, and $$\frac{\Gamma(\alpha' + \beta')}{\Gamma(\alpha')\Gamma(\beta')}$$

is a constant that can be obtained in a tabular form corresponding to the Gamma probability distribution.

When node i does not receive any information about node j, the observation table at node i for node j is empty. In this case, the node i computes a prior probability for node j as uniform distribution, that is Beta ($\alpha=1$, $\beta=1$).

In accordance with an embodiment of the invention, node i rebroadcasts the RREQ message only if the confidence, in probabilistic sense, of the node i in reaching the destination node over a path with no more than 'n' hops is higher than a predefined threshold. Let us denote this confidence as 'Conf.'. Further, the confidence is computed using the maximum aposteriori probability as follows:

For simplified notation, let $\theta = P(C_{i-j})_{MAP}$. Hence, $$Conf. = P(\theta > Threshold_1) = \int_\theta^1 \text{Beta}(\alpha', \beta') d\theta = \int_\theta^1 C \cdot \theta^{(\alpha'-1)} \cdot (1-\theta)^{(\beta'-1)},$$

where C is a constant and can be obtained in a tabular form. Node i checks whether Conf.>Threshold$_2$, wherein Threshold$_1$ and Threshold$_2$ are adaptive thresholds that are configured by the node initiating transmission of the RREQ message (the source node), wherein the value of thresholds are appended in the RREQ message received at a node. If Conf. is greater than Threshold$_2$, node i rebroadcasts RREQ message. Otherwise, node i does not rebroadcast RREQ message.

For example, when the confidence thresholds 'Threshold$_1$, Threshold$_2$' are set high by a node, wherein the node is a source node, only nodes that have a high confidence value 'Conf.' of reaching the destination node within 'n' number of hops rebroadcast the RREQ message. Thus, the total number of control messages (overhead) exchanged in wireless ad-hoc network 100 is considerably reduced. However, there may be an uncertainty that a route may not be established as the confidence thresholds may not be met by relay nodes.

On the other hand, when the confidence thresholds are set low by a node, wherein the node is a source node, a large number of nodes can rebroadcast the RREQ message as the likelihood of meeting the low confidence thresholds is higher. Therefore, the likelihood of route establishment is also higher. Therefore, the invention provides a trade-of between path establishment delay, network congestion, reliability in route establishment, and power consumption granting flexibility to network designers to choose a scenario that suits the application in hand by carefully designing the confidence thresholds.

Consider a scenario wherein a source node needs to establish a route to a destination node. The source node initiates a RREQ message by appending one or more of an IP address of the source node, IP address of the destination node, confidence thresholds Threshold$_1$ and Threshold$_2$, and a maximum number of hops 'n' required for the route. Once the RREQ message reaches nodes in the neighborhood, each node processes the RREQ message and looks up for the destination node. Each node uses one or more observation tables maintained at each node and computes whether the confidence threshold condition is met. If the threshold condition is met, the node rebroadcasts the RREQ message, else discards the RREQ message.

On the other hand, the destination node, on receiving the RREQ message, transmits a RREP message. If the RREP message is not received at the source node within a predefined timeout, the source node initiates another RREQ message for the destination node but reduces the value of Threshold$_2$. The process is repeated by reducing values of Threshold$_2$ until the RREP message is received at the source node.

For example, a sender computes a number of trials allowed to establish route to a destination 'y'. A sender computes Thresholds$_2$ in every route establishment trial as follows: Threshold$_2$=$P(\theta|X_j(1:h))$>0.5, where $\theta=P(C_{i-j})_{MAP}$. If Threshold$_2$>0.5, Threshold$_{2(k)}$=Threshold$_{2(k-1)}$−(Threshold$_{2(k-1)}$−0.5)/2, where k is the order of the trial, k$\in$(2, 3, . . . y). If Threshold$_2$<0.5, Threshold$_{2(k)}$=0.5. In the last trial, the sender sets Threshold$_2$=0; wherein in this case all nodes which receive RREQ rebroadcast it; thus, in the last trial, the protocol performs similar to AODV. The maximum number of trials 'y' is designed to ensure acceptable delay in establishing a path to destination while minimizing the number of control message transmissions (overhead).

In an embodiment of the invention, a stochastic back-off time parameter for a node is estimated using information in one or more of a connectivity field, a hop count field, a weight field and a value pertaining to a number of observations for which the maximum aposteriori probability of connectivity is computed based on time of observations. The back-off time parameter for a node represents a waiting time required by a node before it accesses the wireless medium for data transmission. The wireless transmission medium uses at least one of a Medium Access Control (MAC) protocol and a Carrier Sense Multiple Access (CSMA)/Collision Avoidance (CA)—IEEE 802.11 protocol. According to the 802.11 protocol, a node is assigned a random back-off within a time window according to a uniform probability distribution.

In accordance with an embodiment of the invention, a destination node receives RREQ messages from multiple routes, and selects the path from which it receives the first RREQ message. To increase the network bandwidth and reduce energy consumption in the network, the invention increases the probabilistic likelihood that a first RREQ message received at the destination node is delivered over a path with the least number of hops. Each node manipulates a MAC layer back-off time parameter based on a probability of connectivity and a number of hops to the destination node that is computed using information stored in the one or more observation tables for each node.

For example, let a maximum back-off time parameter be X measured in unit of time, every node i computes a maximum likelihood probabilities '$P(C_{i-j}|k)_{ML}$' that node i is connected to the destination node j over a path that has 'k' number of hops, wherein k$\in$(1, 2, . . . n) using information in the one or more observation tables at node i, where 'n' is the maximum number of hops allowed on a path. Out of all probabilities computed $P(C_{i-j}|k)_{ML}$, each node finds the number of hops on a path to the destination corresponding to the highest value of $P(C_{i-j}|k^*)_{ML}$, denoted as k*. Each node, then, uses a mapping table as illustrated in FIG. 9 to identify a range of the back-off time parameter (time windows) at which a node uses for assigning a random back-off time. Once the range of the back-off time parameter is identified, each node is randomly assigned a back-off time '$t_k^*$' using uniform probability distribution such that $t_k^*$ is in the time window: $[((k^*-1)/n) X, (k^*/n) X]$ as illustrated in FIG. 8.

In yet another exemplary embodiment of the invention, scaling factor is calculated for each entry in the observation table stored at the first node pertaining to a second node based on the time of detecting an IP address of the second node. The scaling factor is used for providing extra weight to fresh observations pertaining to the second node as compared to the old ones and utilizes the information pertaining to the weights while computing the maximum aposteriori probability of connectivity as illustrated in FIG. 9.

In an embodiment, the scaling factor is calculated by measuring the time lapses between the time instant at which the IP address is detected in the broadcast message and the time instant at which the probability of connectivity computation is executed for node i to node j pertaining to observation table of node i for node j. Fresh observations are assigned higher weights compared to old observations as illustrated in FIG. 9. A timeout is considered for evicting records from observation tables. When the timeout expires for an observation, a node clears the record from the observation table. If all records in the observation table at node i for node j are expired, node i sets a prior probability for connectivity to node j back to Beta (1, 1). The timeout is carefully designed to reflect mobility of each node and a rate at which each node joins or leaves the network.

In another embodiment, the scaling factor is calculated by utilizing weights and number of records in the observation table over which the maximum aposteriori probability is computed. Suppose node i has 6 unexpired records stored in the observation table at node i for node j FIG. 10. Then, the maximum likelihood probability of connectivity from node i to node j is computed as $P(C_{i-j})_{ML(using\ weight)}=(6/6+4/6+3/6+2/6)/(Total\ weights)=(15/6)/(21/6)=15/21=0.714$. Compare this value with that when no weight is applied to the observation, $P(C_{i-j})_{ML(no\ weight)}=4/6=0.667$. Thus, the computed probability when weights are used is different. This is because our method accounts for the time of observations when computing $P(C_{i-j})_{ML}$ and $P(C_{i-j})_{MAP}$.

Figure 10:
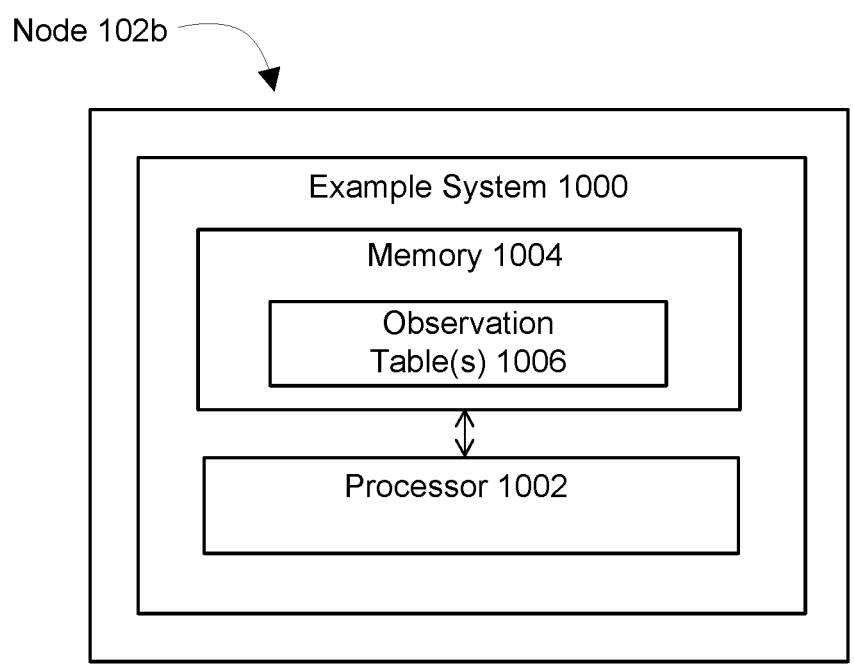
FIG. 10 illustrates a system present within a node for routing broadcast messages by computing a maximum aposteriori probability of connectivity for a plurality of nodes in a wireless ad-hoc network in accordance with an embodiment of the invention.

FIG. 10 illustrates a system 1000 present within node 102b for routing broadcast messages by computing a maximum aposteriori probability of connectivity for plurality of nodes 102a-102g in wireless ad-hoc network 100 in accordance with an embodiment of the invention. Each node of plurality of nodes 102a-102g maintains one or more observation tables corresponding to every other node of plurality of nodes 102a-102g in wireless ad-hoc network 100.

As illustrated, node 102b of the plurality of nodes includes a processor 1002 and a memory 1004. Processor 1002 is configured to enable node 102b to receive a broadcast message from one or more second nodes of plurality of nodes 102a-102g in wireless ad-hoc network 100. On receiving the broadcast message at node 102b, processor 1002 enables node 102b to obtain information pertaining to the one or more second nodes from the broadcast message. Thereafter, processor 1002 enables node 102b to store information pertaining to the one or more second nodes in one or more observation tables 1006 present in memory 1004 of node 102b, wherein node 102b includes an observation table for each second node and wherein an observation table includes a connectivity field, a hop count field, a message identifier field and a weight field, as illustrated in FIG. 8. Processor 1002 then enables node 102b to compute a maximum aposteriori probability of connectivity for the one or more second nodes from the first node using information in one or more of a connectivity field, a hop count field, a weight field, and a message identifier field of the one or more observation tables present in the first node, wherein the maximum aposteriori probability of connectivity is computed utilizing Bayesian approach.

Further, processor 1002 is configured to compute a confidence value for reaching a second node from node 102b through one or more paths containing one or more hops and no more than 'n' hops using information present in one or more of the connectivity field and a weight factor pertaining to each observation for which the maximum aposteriori probability of connectivity is computed for the second node.

Processor 1002 is also configured to estimate a stochastic back-off time parameter for message broadcast using information in one or more of a connectivity field, a hop count field, a weight field and a value pertaining to a number of observations for which the maximum aposteriori probability of connectivity is computed for the one or more second nodes based on time of observations.

Processor 1002 is also configured to utilize scaling factors using information in one or more of a connectivity field, a hop count field, a weight field and a value pertaining to a number of observations for which the maximum aposteriori probability of connectivity is computed for the one or more second nodes based on time of observations.

Thereafter, processor 1002 enables the first node to transmit broadcast messages to the one or more second nodes based on the maximum aposteriori probability of connectivity computed for the one or more second nodes from the first node.

Various advantages provided by the invention are outlined below.

The invention enables each node in the wireless ad-hoc network to maintain observation tables for all other nodes in the wireless ad-hoc network in response to overhearing RREQ and RREP messages. The invention, then, enables each node to utilize Bayesian probability approach to determine the possibility of reaching other nodes within a predefined number of hops. Thus, the nodes do not need to exchange periodic routing information between neighboring nodes or update other nodes when a route is broken. This approach significantly reduces the number of control messages exchanged in the network, thereby increasing network throughput and reducing power consumption, traffic congestion and interference.

Further, the invention enables each node to establish routes with least number of hops utilizing the stochastic back-off technique implemented at the MAC layer of each node. Also, the flexibility in selecting confidence thresholds for computing the maximum aposteriori probability of connectivity between the nodes enables each node to balance between route establishment delay and the number of exchanged control messages.

Additionally, the invention provides each node the flexibility in selecting the number of hops for establishing routes. Therefore, the design is adaptable to the needs of and QoS required by the applications.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for routing broadcast messages by managing a plurality of observation tables in a wireless ad-hoc network having a plurality of nodes, wherein each node maintains an observation table corresponding to each node of the plurality of nodes in the wireless ad-hoc network, the method comprising:
receiving, at a first node, a broadcast message from at least one second node of the plurality of nodes in the wireless ad-hoc network;
obtaining information pertaining to the at least one second node from the broadcast message at the first node;
storing the information pertaining to the at least one second node in at least one observation table present in the first node, wherein the first node comprises an observation table for each second node, wherein an observation table comprises a connectivity field, a hop count field, a weight field, and a message identifier field, wherein the connectivity field in the observation table maintained at the first node corresponding to the second node represents a possibility of reaching the second node within 'n' number of hops from the first node and the connectivity field is updated with value as '1' in response to detecting an IP address corresponding to the second node within 'n' number of hops from the first node, wherein 'n' is a predetermined value in the information obtained from the source node and appended in the broadcast message; and
transmitting broadcast messages from the first node to the at least one second node based on the information pertaining to the at least one second node in at least one observation table present in the first node.

2. The method of claim 1, wherein the first node is one of a source node, a relay node and a destination node.

3. The method of claim 1, wherein a second node is one of a source node, a relay node and a destination node.

4. The method of claim 1, wherein a broadcast message is one of a route request message from a source node for a destination node, a re-broadcast message from a relay node and a route reply message from a destination node.

5. The method of claim 4, wherein a route request message, a re-broadcast message and a route reply message comprises information pertaining to at least one of an IP address of a source node, an IP address of a destination node and an IP address of at least one relay node.

6. The method of claim 1, wherein storing the information pertaining to the at least one second node in the at least one observation table in the first node comprises:
determining presence of at least one IP address corresponding to the at least one second node;
creating at least one observation table corresponding to the at least one second node in response to detecting presence of the at least one IP address corresponding to the at least one second node; and
appending the information pertaining to the at least one second node to the at least one observation table in the first node.

7. The method of claim 6, wherein appending information pertaining to a second node in an observation table in the first node comprises adding a new entry to the observation table based on the information pertaining to the second node.

8. The method of claim 1, wherein a second node is a destination node, a connectivity field in an observation table maintained at the first node corresponding to the second node is updated with value as '0' in absence of a route reply message from the second node within a predefined time duration.

9. The method of claim 1, wherein a hop count field in an observation table maintained at the first node corresponding to a second node represents a number of hops for reaching the second node from the first node.

10. A method for routing broadcast messages by computing a maximum aposteriori probability of connectivity for a plurality of nodes in a wireless ad-hoc network, wherein each node maintains an observation table corresponding to each node of the plurality of nodes in the wireless ad-hoc network, the method comprising:
receiving, at a first node of the plurality of nodes, a broadcast message from at least one second node of the plurality of nodes in the wireless ad-hoc network;
obtaining information pertaining to the at least one second node from the broadcast message at the first node;
storing the information pertaining to the at least one second node in at least one observation table present in the first node, wherein the first node comprises an observation table for each second node, wherein the observation table comprises a connectivity field, a hop count field, a weight field and a message identifier field, wherein a weight or scaling factor pertaining to a node is calculated for each observation table at the first node based on the time of detecting an IP address of the second node stored in the observation table of the first node;
computing, at the first node, a maximum aposteriori probability of connectivity for the at least one second node from the first node using information in at least one of a connectivity field, a hop count field, a weight field and a message identifier field of the at least one observation table present in the first node, wherein the maximum aposteriori probability of connectivity is computed utilizing Bayesian approach; and
transmitting broadcast messages from the first node to the at least one second node based on the maximum aposteriori probability of connectivity computed for the at least one second node from the first node.

11. The method of claim 10, wherein computing the maximum aposteriori probability of connectivity further comprises computing a confidence value for reaching the at least one second node from the first node through at least one path containing no more than 'n' hops using information present in at least one of the connectivity field and a scaling factor pertaining to each observation for which the maximum aposteriori probability of connectivity is computed for the at least one second node.

12. The method of claim 10 further comprises estimating a stochastic back-off time parameter for the at least one second node for re-broadcasting the broadcast message using information in at least one of a connectivity field, a hop count field, a weight field and a value pertaining to a number of observations for which the maximum likelihood probability of connectivity is computed for the at least one second node.

13. The method of claim 12, wherein a back-off time parameter for a node represents an average waiting time of the node for accessing a wireless transmission medium for data transmission.

14. The method of claim 12, wherein a back-off time parameter is computed at the Media Access Control (MAC) layer.

15. The method of claim 10, wherein a second node is a relay node, the second node re-broadcasts the broadcast message received from a first node when a confidence value computed for the second node is greater than a predefined threshold.

16. The method of claim 10, wherein computing the maximum aposteriori probability of connectivity further comprises obtaining information pertaining to a maximum hop count allowable for the at least one second node from the broadcast message at the first node.

17. A system for routing broadcast messages by computing a maximum aposteriori probability of connectivity for a plurality of nodes in a wireless ad-hoc network, wherein each node of the plurality of nodes comprises:
  a memory;
  a processor in communication with the memory, wherein the processor is configured to:
  enable a first node of the plurality of nodes to receive a broadcast message from at least one second node of the plurality of nodes in the wireless ad-hoc network;
    enable the first node to obtain information pertaining to the at least one second node from the broadcast message at the first node;
  enable the first node to store the information pertaining to the at least one second node in at least one observation table present in the first node, wherein the first node comprises an observation table for each second node, wherein an observation table comprises a connectivity field, a hop count field, a weight field, and a message identifier field;
  enable the first node to compute a maximum aposteriori probability of connectivity for the at least one second node from the first node using information in at least one of a connectivity field, a hop count field, a weight field, and a message identifier field of the at least one observation table present in the first node, wherein the maximum aposteriori probability of connectivity is computed utilizing Bayesian approach; and
  enable the first node to transmit broadcast messages to the at least one second node based on the maximum aposteriori probability of connectivity computed for the at least one second node from the first node, and
  wherein the processor is further configured to estimate a stochastic back-off time parameter for the at least one second node for re-broadcasting the broadcast message using information in at least one of a connectivity field, a hop count field, a weight field, and a value pertaining to a number of observations for which the maximum aposteriori probability of connectivity is computed for the at least one second node.

18. The system of claim 17, wherein the processor is further configured to compute a confidence value for reaching the at least one second node from the first node through at least one path containing at least one hop using information present in at least one of the connectivity field and a value pertaining to each observation for which the maximum aposteriori probability of connectivity is computed for the at least one second node.

19. The system of claim 17, wherein a second node is a relay node, the second node rebroadcasts the broadcast message received from a first node when the confidence value computed for the second node is greater than a predefined threshold.

20. The system of claim 17, wherein the processor is configured to obtain information pertaining to a maximum hop count allowable for the at least one second node from the first node.

* * * * *